(12) United States Patent
Atluri et al.

(10) Patent No.: US 8,363,373 B2
(45) Date of Patent: Jan. 29, 2013

(54) ENCLOSURE WITH AN E-FUSE CONNECTED TO MULTIPLE BLADE COMPUTERS

(75) Inventors: Prasad R Atluri, Houston, TX (US); Ruben A Ayala, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 275 days.

(21) Appl. No.: 12/844,852

(22) Filed: Jul. 28, 2010

(65) Prior Publication Data

US 2012/0026667 A1    Feb. 2, 2012

(51) Int. Cl.
   *H02H 5/04*    (2006.01)

(52) U.S. Cl. .................................. 361/103; 361/93.8
(58) Field of Classification Search .................. 361/18, 361/93.7–93.9, 103
See application file for complete search history.

(56) References Cited

U.S. PATENT DOCUMENTS

| | | | |
|---|---|---|---|
| 7,538,519 B2 * | 5/2009 | Daou et al. | 320/134 |
| 2009/0134703 A1 * | 5/2009 | Chung et al. | 307/64 |
| 2011/0026177 A1 * | 2/2011 | Atluri et al. | 361/56 |
| 2011/0170223 A1 * | 7/2011 | DiMarco et al. | 361/94 |
| 2011/0320826 A1 * | 12/2011 | Simmons et al. | 713/300 |
| 2012/0126785 A1 * | 5/2012 | Paik et al. | 324/103 R |

* cited by examiner

*Primary Examiner* — Danny Nguyen

(57) ABSTRACT

One embodiment is an enclosure that has a plurality of server computers connected to an e-fuse. A circuit in the enclosure provides a 400V output to the e-fuse.

18 Claims, 4 Drawing Sheets

ENCLOSURE WITH AN E-FUSE CONNECTED TO MULTIPLE BLADE COMPUTERS

BACKGROUND

Blade enclosures house multiple server blades that can provide a variety of different services, such as power, cooling, networking, and computer processing tasks. A single blade enclosure can include eight blade servers, sixteen blade servers, or more.

Blade enclosures include one or more power supply units (PSUs) that convert incoming alternating current (AC) power to direct current (DC) power. The power supply units provide power to the blade servers at a relatively low voltage, such as +12V or 48V. These low voltages reduce power efficiency of the blade enclosure and increase losses in power distribution.

DETAILED DESCRIPTION

Example embodiments relate to apparatus and methods that provide high voltage to blade enclosures. One embodiment is an electronic circuit or e-fuse circuit that enables a high voltage, such as 400V DC, to be distributed in a blade enclosure or server rack.

Some blade enclosures or server racks use a standard cartridge fuse for short circuit protection. These cartridge fuses take time to clear the fault. Under fault conditions the time it takes depends upon the fault current and its passive fuse I²t rating. Under these conditions, a non-distributed power architecture is used. For example, a power supply receives an AC input and provides multiple DC outputs, such as +12V, +5V, +3.3V, etc. This type of power architecture, however, is not suitable for blade servers, such as blade servers enclosed in a rack or enclosure.

In distributed power architectures of blade servers, the power supply normally delivers a single output voltage (preferably +12V) at the output. This +12V is distributed all over the rack to the blade servers. From this +12V, the voltages for the memory card, PCI card, etc. are delivered using local DC-DC converters located in an enclosure.

Figure 2:
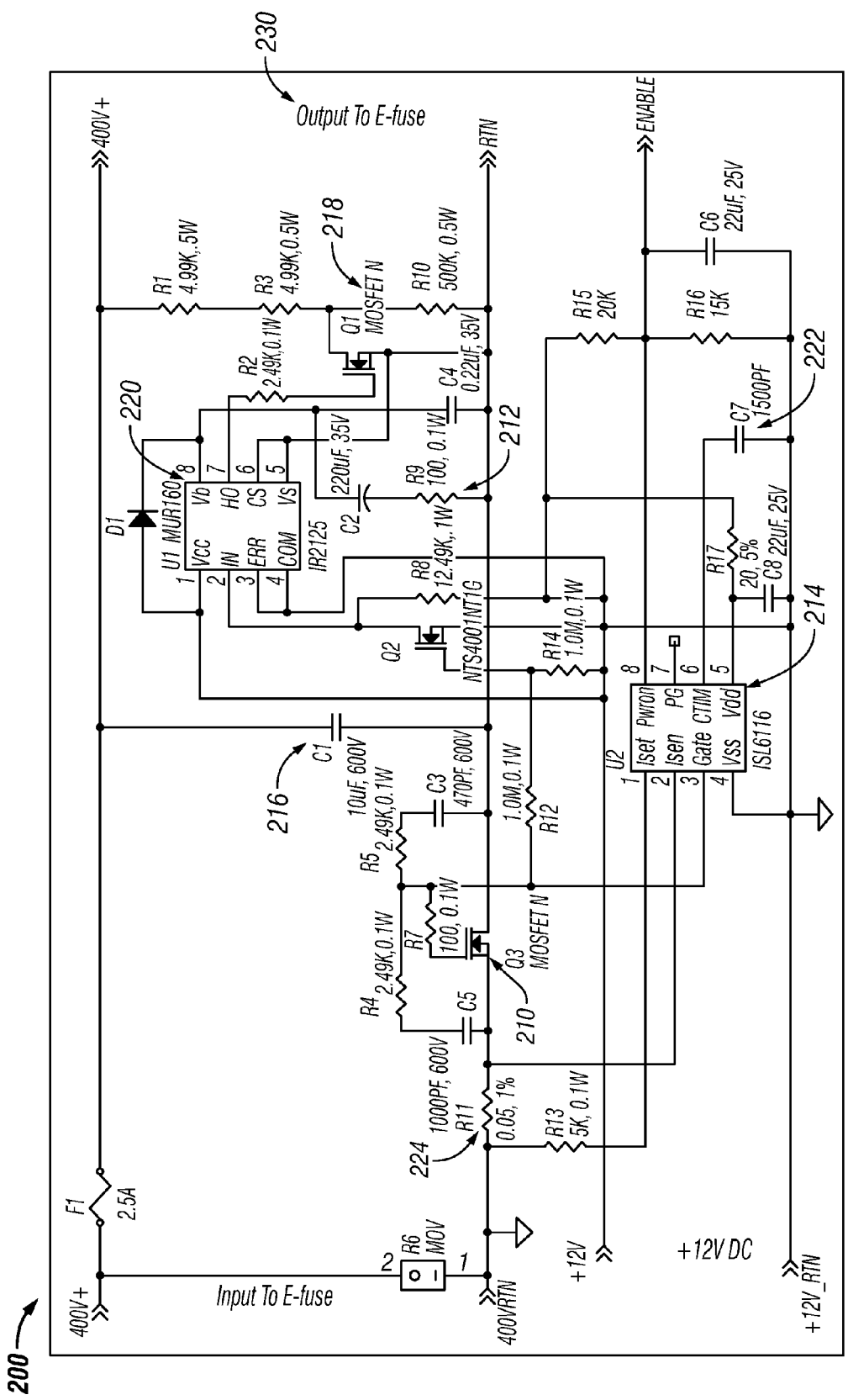
FIG. 2 is a schematic of an e-fuse circuit in accordance with an example embodiment.
Figure 3:
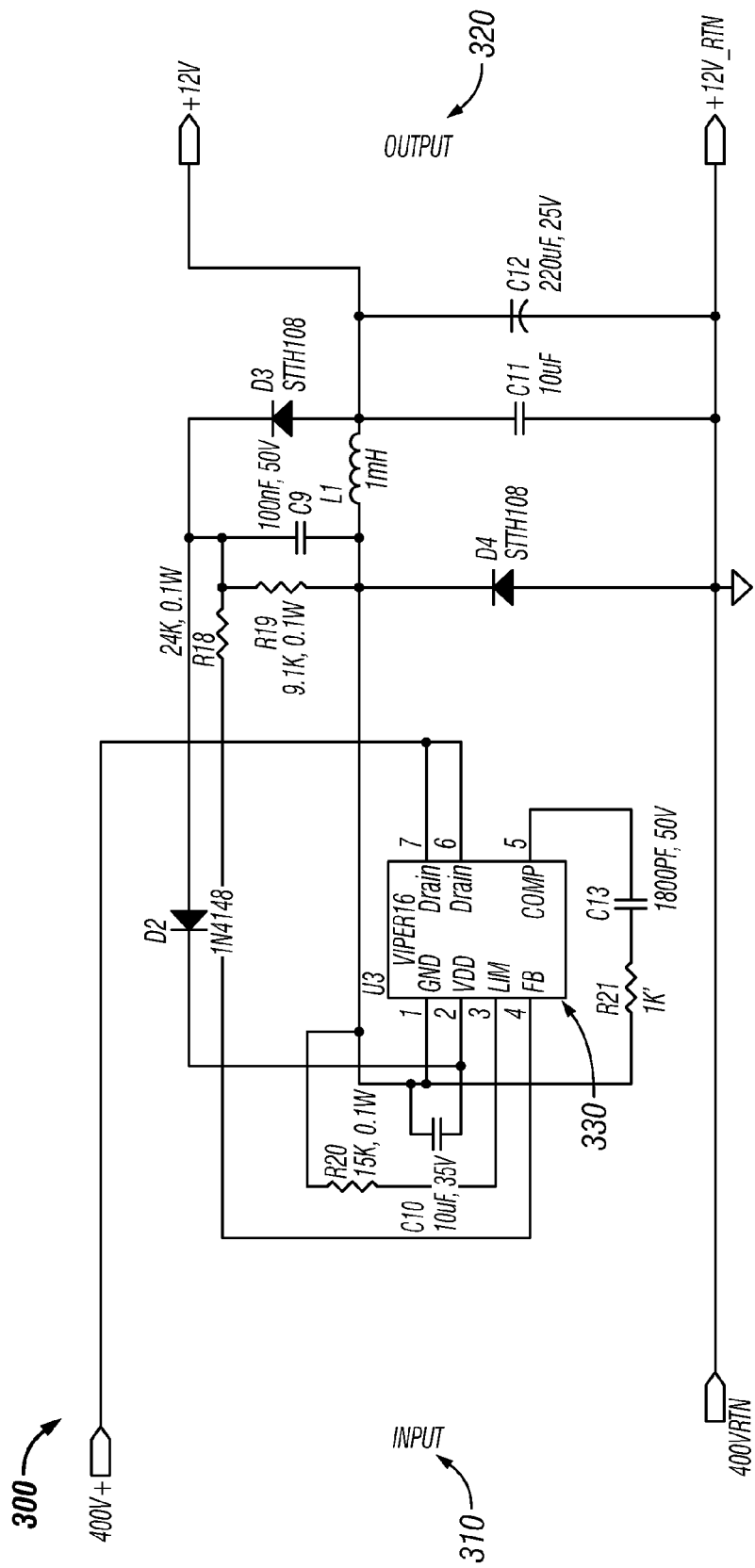
FIG. 3 is a schematic of a circuit to convert 400V to 12V in accordance with an example embodiment.

In one embodiment, the e-fuse circuits (shown in FIGS. 2 and 3) are located in the back plane or another location in the enclosure. Thus, a fault in one server will not disturb continuous operation of another server in the same enclosure. Further, the e-fuse circuit acts as a fast turn-off resettable fuse that isolates the fault. The e-fuse circuit shown in FIGS. 2 and 3 isolates a fault in an enclosure having some blade servers that are relatively close to the power supply and other blade servers that are farther away from the power supply. Moreover, e-fuse circuits of example embodiments support the addition and removal of new servers or blades to the enclosure while some of the other blade servers are in operation in an enclosure.

Figure 1A:
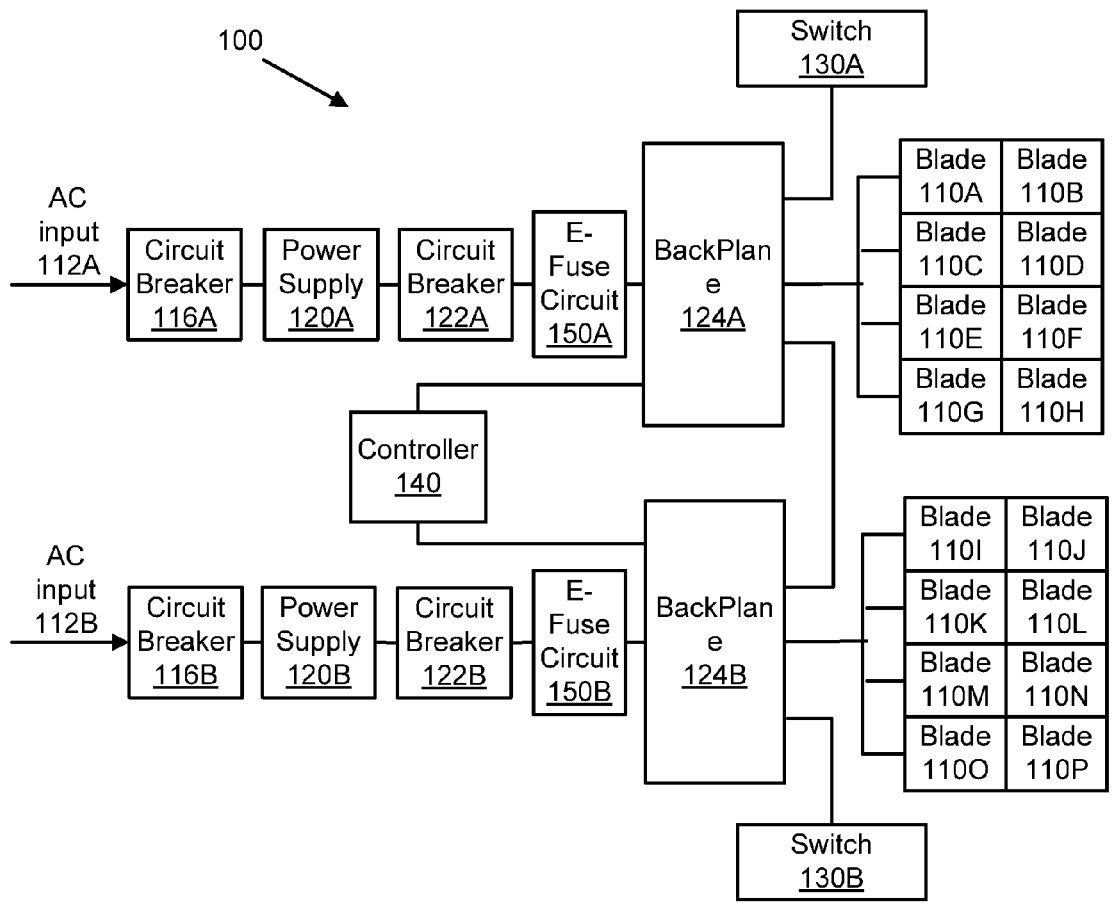
FIG. 1A is an enclosure having multiple blades or servers in accordance with an example embodiment.

FIG. 1A shows an enclosure 100 housing multiple blades or servers 110A-110P. These blades or servers can be combined into sleeves and include various numbers or configurations (such as 8 blades, 16 blades, etc.). Further, two or more enclosures can be connected together and located physically proximate to each other in a single rack.

Two independent AC sources 112A, 112B provide redundant power to the enclosure (e.g., power supplied from two separate AC transformers). Upon failure of one of the power sources, the other power source can provide sufficient power to operate the servers 110A-110P and other hardware located in the enclosure 100 provided the backplanes are connected together. Power source 112A connects to a first AC circuit breaker 116A and a first set of power supplies 120A, and power source 112B connects to a second AC circuit breaker 116B and a second set of power supplies 120B. Each set of power supplies can include one or more power supplies located in or near the enclosure.

Power supplies 120A connect to a first DC circuit breaker 122A, and power supplies 120B connect to a second circuit breaker DC 122B. DC Circuit breaker 122A, in turn, connects to a first backplane 124A, and DC circuit breaker 122B connects to a second backplane 124B. These circuit breakers are intended for catastrophic fault isolation (multiple failures in an enclosure including e-fuse) and cut off power to the enclosure.

The enclosure also includes various switches, such as a network switch 130A connected to backplane 124A and network switch 130B connected to backplane 124B. A network backplane controller 140 connects to backplanes 124A, 124B. Furthermore, output from the backplane 124A connects to output of backplane 124B. Thus, in the event of one of the AC input 112A fails, the servers normally fed from 124A are fed from 124B and the whole enclosure will not see any effect of AC source failure 112A.

The enclosure 100 also includes one or more high voltage e-fuse or electronic fuse circuits 150A and 150B. Although multiple separate e-fuse circuits are shown at 150A and 150B, a single e-fuse could be used to serve both backplanes in the enclosure.

In one embodiment, this e-fuse is a 400V e-fuse circuit that is located between the power supplies 120A, 120B and the backplanes 124A, 124B. Example embodiments are not limited to this particular location for the e-fuses 150A, 150B. By way of example, the e-fuse can be located in one or both of the backplanes 124A, 124B, in one or more of the blades or servers 110A-110P, or in another location in the enclosure. For example, each backplane includes a single, separate e-fuse. E-fuse 150A is located in backplane 124A and serves blades 110A-110H. E-fuse 150B is located in backplane 124B and serves blades 110I-110P.

Figure 1B:
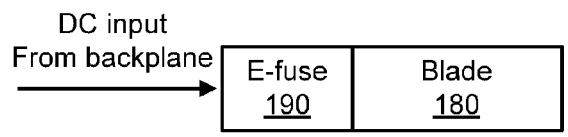
FIG. 1B shows a blade or server with an e-fuse in accordance with an example embodiment.

Alternatively, each blade or server 110A-110P includes a separate e-fuse. FIG. 1B shows a blade or server 180 having a separate e-fuse 190 that is dedicated to serving this blade or server. DC input from the backplane connects to the e-fuse.

As used herein and in the claims, an "e-fuse" or an "electronic fuse" is a circuit that protects electronic components from short circuits, electrical overloads, device failures, and/or limits current usage by electronic components.

FIG. 2 show a schematic of an e-fuse circuit 200 in accordance with an example embodiment. By way of example, input to the e-fuse is 400V fed from a power supply.

The circuit 200 includes a power semiconductor (metal oxide semiconductor field effect transistor, MOSFET transistor) Q3 (shown at 210), a current sense resistor R11 (shown at 224), an integrated circuit (IC) controller U2 (shown at 214), and an output capacitor C1 (shown at 216). The controller 214 has its own Enable pin and is used to turn-on and turn-off the electronic fuse by turning semiconductor 210 ON and OFF. Thus, the MOSFET 210 functions as an on/off switch to turn on and turn off current to the e-fuse. Because of the presence of an intrinsic anti-parallel diode of the MOSFET Q3 (shown at 210), controller U2 (shown at 214) controls its current through MOSFET Q3 in only one direction. Controller 214 can drive the MOSFET 210. Moreover, MOSFET 210 can be controlled for inrush current control and fast turn-off under a short circuit conditions, an over-current conditions, and input under voltage conditions.

After a fault, the electronic fuse 200 can be reset either by recycling the ENABLE signal or by recycling the input DC voltage.

A timing capacitor C7 (shown at 222) holds the MOSFET in a linear region for a pre-programmed period of time (e.g., between 100 µS to 200 µS) and then latches off the e-fuse circuit. A current sense resistor R11 (shown at 224) monitors current to shut off the MOSFET. Resistor 224 continuously monitors current flowing through the circuitry and shuts off the MOSFET upon detecting a predetermined current limit. Upon detecting current at a predetermined limit, a signal is sent to gate 3 of the controller 214 which then shuts off the MOSFET.

The circuit 200 in FIG. 2 also prevents false triggering of disruption to power to the blades (e.g., shutting off power upon detecting a voltage spike). The timing capacitor 222 initiates a timing (e.g., 50 µs-200 µs) to prevent permanently turning off power to the blades. For example, if the output current to the e-fuse 230 exceeds a predetermined limit, then timing of the capacitor starts. If the output exceeds the predetermined current limit after expiration of the time limit, then the e-fuse is triggered (turned-off). If the output does not exceed the predetermined current limit after expiration of the time limit, then the e-fuse is not triggered (turned-off).

When the MOSFET 210 shuts off, the capacitor 216 is fully charged. This capacitor functions to quickly reduce the output voltage 230 to the e-fuse. For example, after an elapsed time of ten seconds, the output voltage is 50V or less.

FIG. 3 is a schematic of a circuit 300 to convert 400V to 12V in accordance with an example embodiment. A 400V input (shown at 310) is reduced to a 12V output (shown at 320). The circuit includes a controller 330, and various electronic components, such as a plurality of diodes D2-D3, a plurality of capacitors C10-C13, and a plurality of resistors R19-R21. By way of example, 12V is generated to supply power to various integrated circuits (including e-fuse) within the enclosure.

The circuit controller 220 discharges the e-fuse output capacitor C1 (shown at 216 in FIG. 2) to less than 60V within one (1) second of MOSFET Q3 (shown at 210 in FIG. 2) turn-off by the MOSFET 218.

The electronic fuse in accordance with an example embodiment enhances circuit reliability by quickly isolating a fault (e.g., a fault is isolated in less than 100 µS compared to the couple of milliseconds normally taken by conventional fuses). Furthermore, ratings of electronic components in the enclosure can be lowered. Using electronic fuse, example embodiments provide control of the in rush current, provide input reverse voltage protection, and provide fast turn-off under over current and short circuit conditions.

One embodiment increases the input voltage to an enclosure to 400V and implements a distributed power architecture that has a high voltage fast disconnect under fault conditions. This disconnect occurs without disturbing the input 400V bus (while inserting and extracting a blade or server) and server blades operating in the enclosure or rack. The e-fuse circuit disconnects the load under fault conditions quickly and limits an in-rush of current from the bus under hot insertion and extraction operations of a blade or server.

FIGS. 2 and 3 show two exemplary circuits used in conjunction with a 400V e-fuse. These circuits show example values (e.g., currents, voltages, etc.) for various resistors, capacitors, MOSFETS, etc. These values are provided for illustration as an example embodiment and should not be construed to limit example embodiments. Further example, embodiments are not limited to 400V and include, for example, 400V plus or minus 10% DC input voltage.

Figure 4:
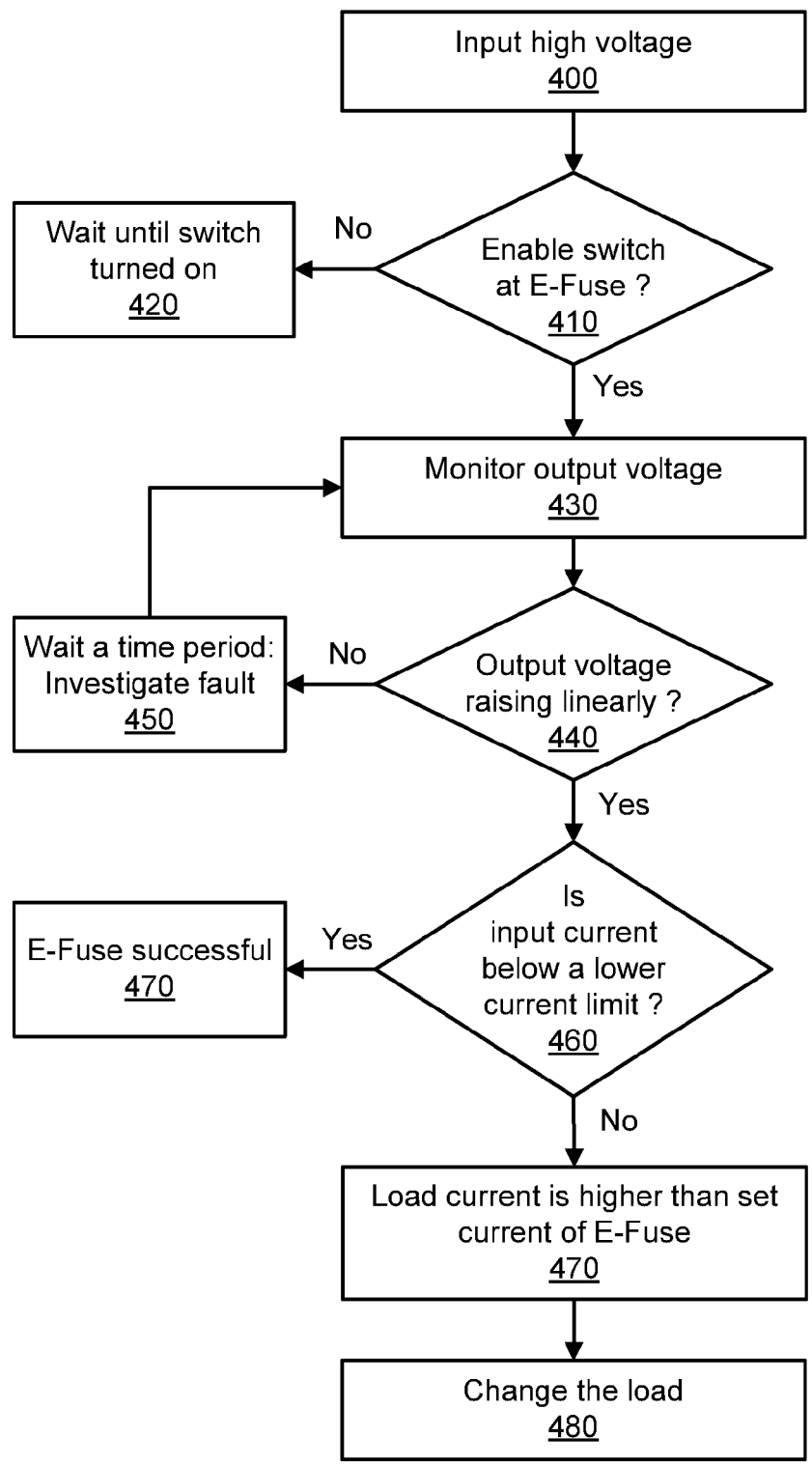
FIG. 4 is a flow diagram showing operation of an e-fuse in accordance with an example embodiment.

FIG. 4 is a flow diagram showing operation of an e-fuse in accordance with an example embodiment.

According to block 400, a high input voltage is provided to the enclosure and/or e-fuse circuitry. For example, an input voltage of 400V is input.

According to block 410, a determination is made as to whether a switch at the e-fuse is enabled. If the switch is not enabled, then flow proceeds to block 420 and wait until the switch is turned on. Here, the enable signal is low. If the switch is enabled, then flow proceeds to block 430, and the output voltage of the e-fuse is monitored.

According to block 440, a determination is made as to whether the output voltage is raising linearly. If the output voltage is raising linearly, then according to block 450 a time period is waited (e.g., wait one or two seconds). If a fault occurs, an investigation into the cause of the fault is performed.

If the output voltage is not raising linearly, then a determination is made at block 460 as to whether the input current to the e-fuse is below a lower current limit. If the input current is below this current limit, then the e-fuse successfully or properly operated.

If the input current to the e-fuse is not below the current limit, then the load current is higher than the current of the e-fuse according to block 470.

According to block 480, the load is changed (e.g., change the current limit on the e-fuse).

In one example embodiment, one or more blocks or steps discussed herein are automated with the e-fuse and/or circuitry connected to the e-fuse. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other example embodiments. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of various example embodiments. Numerous variations and modifications will become apparent to those skilled in the art once the above disclosure is fully appreciated. It is intended that the following claims be interpreted to embrace all such variations and modifications.

What is claimed is:

1. An enclosure, comprising:
   a plurality of servers;
   an e-fuse connected to the servers; and
   a circuit that provides a 400V output to the e-fuse, the circuit includes an output capacitor that initiates timing upon detecting an output voltage to the e-fuse that exceeds a predetermined limit.

2. The enclosure of claim 1, wherein the circuit includes a MOSFET transistor that switches current on and off to the e-fuse.

3. The enclosure of claim 1, wherein the circuit includes a MOSFET transistor and a resistor that monitors current flowing to the MOSFET transistor and shuts off the MOSFET transistor upon detecting a current at a predetermined level.

4. The enclosure of claim 1, wherein the e-fuse is triggered when the timing exceeds the predetermined limit and the e-fuse continues to operate when the timing does not exceed the predetermined limit.

5. The enclosure of claim 1, wherein the circuit includes a transistor and a controller connected to the transistor through an Enable pin that turns the transistor on and off.

6. The enclosure of claim 1, wherein the circuit includes a transistor and a timing capacitor that holds the transistor in a linear region for a pre-programmed period of time between 100 µS to 200 µS before activating the e-fuse.

7. An enclosure, comprising:
   plural blade computers;
   two backplanes connected to the blade computers;
   two AC power sources that provide redundant power to the backplanes; and
   an e-fuse circuit that includes an e-fuse and circuitry to provide a 400V power supply through the enclosure, the e-fuse circuit includes a timing capacitor that prevents false triggering of disruption to power to the plural blade computers when the e-fuse circuit detects a voltage spike.

8. The enclosure of claim 7, wherein each of the two backplanes includes a separate 400V e-fuse.

9. The enclosure of claim 7, wherein each of the plural blade computers includes a separate 400V e-fuse.

10. The enclosure of claim 7, wherein the e-fuse circuit includes a transistor and a resistor that continuously monitors current flowing through the circuitry and shuts off the transistor upon detecting a current that exceeds a predetermined limit.

11. The enclosure of claim 7, wherein the enclosure includes eight blade computers receiving power from a first one of the two backplanes and eight other blade computers receiving power from a second one of the two backplanes.

12. The enclosure of claim 7, wherein the e-fuse circuit includes a transistor and an output capacitor that functions to reduce output voltage to the e-fuse to 50V or less after a period of ten seconds.

13. The enclosure of claim 7, wherein the e-fuse circuit isolates a fault within 100 microseconds.

14. A method executed by an e-fuse circuit in an enclosure housing plural servers, the method comprising:
   providing 400V to the e-fuse circuit;
   monitoring output voltage of the e-fuse circuit; and
   waiting a time period designated by a timing capacitor before activating a fuse to discontinue power to the plural servers after a detection that the output voltage is rising.

15. The method of claim 14 further comprising:
   detecting a fault with the e-fuse circuit;
   disconnecting load the plural servers within 100 microseconds of detecting the fault.

16. The method of claim 14 further comprising, determining that the fuse properly operated when the output voltage is not rising and input current to the fuse is below a current limit.

17. The method of claim 14 further comprising, inserting and extracting one of the servers without disturbing the 400V distribution through the enclosure.

18. The method of claim 14 further comprising, providing a 400V e-fuse inside each of the plural servers.

* * * * *